J. R. STEPHENSON.
TRANSMISSION OR CHANGE SPEED DEVICE.
APPLICATION FILED SEPT. 8, 1913. RENEWED NOV. 19, 1914.
1,189,401.
Patented July 4, 1916.
3 SHEETS—SHEET 1.
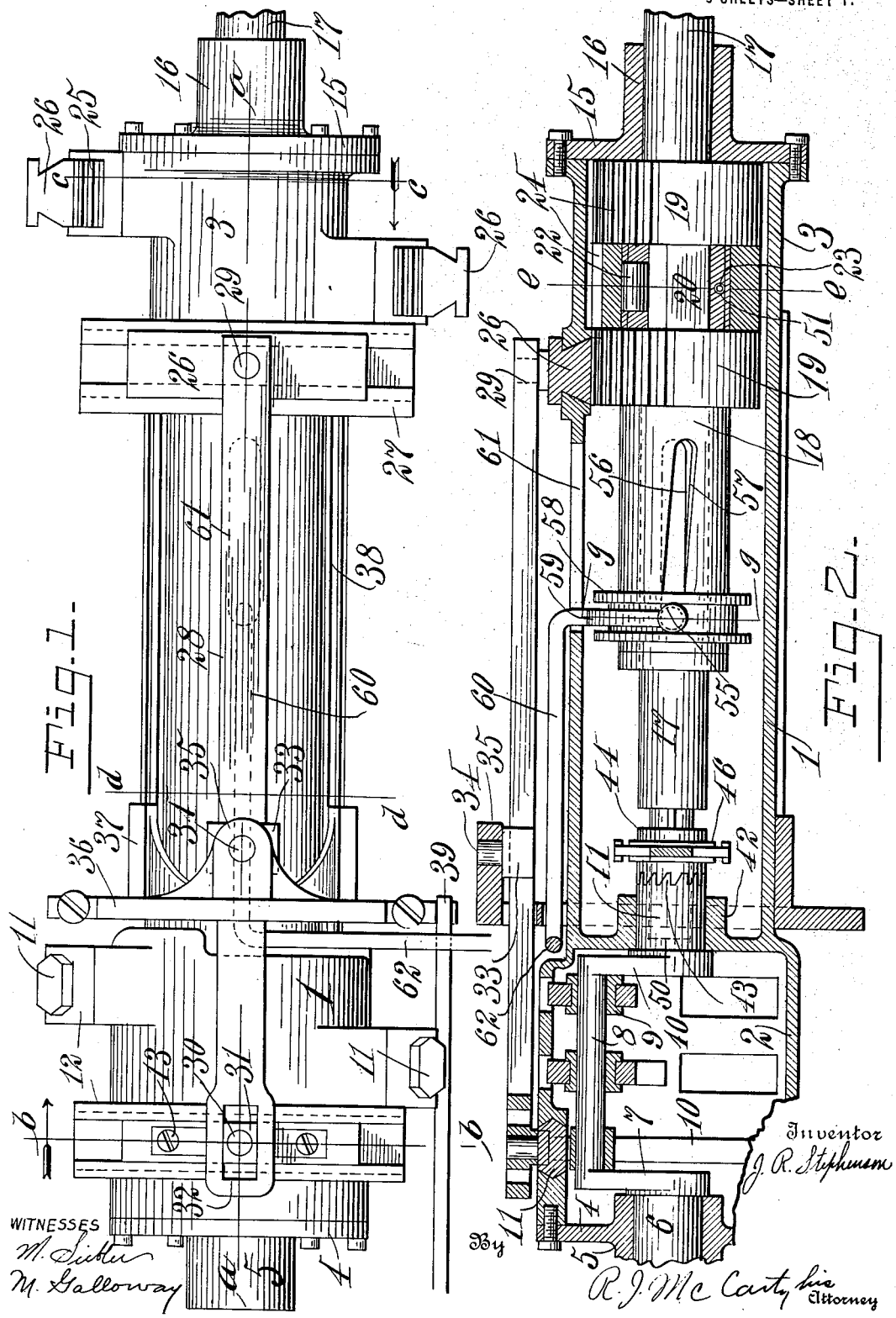

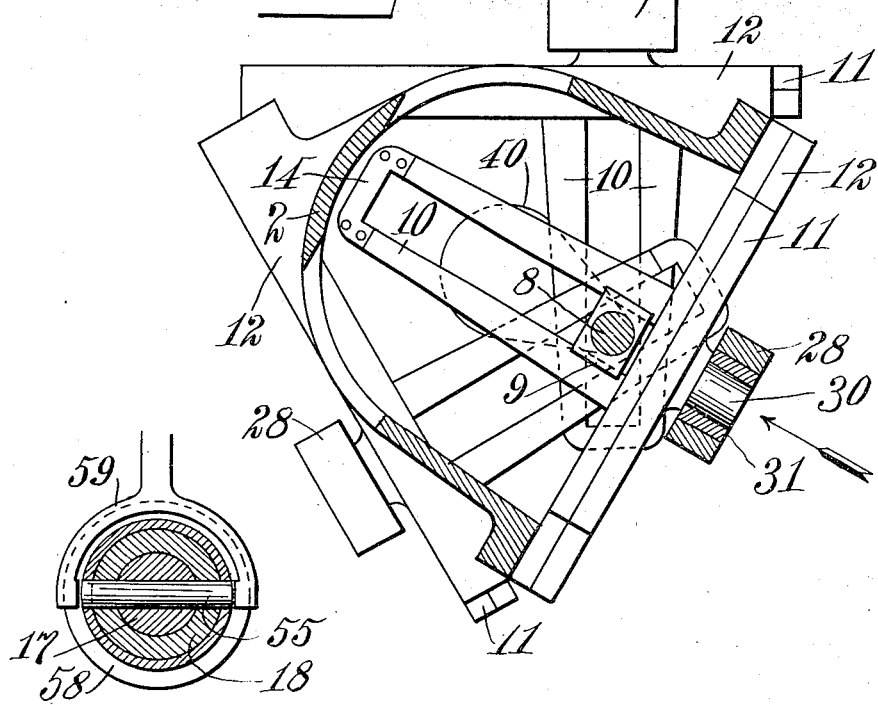
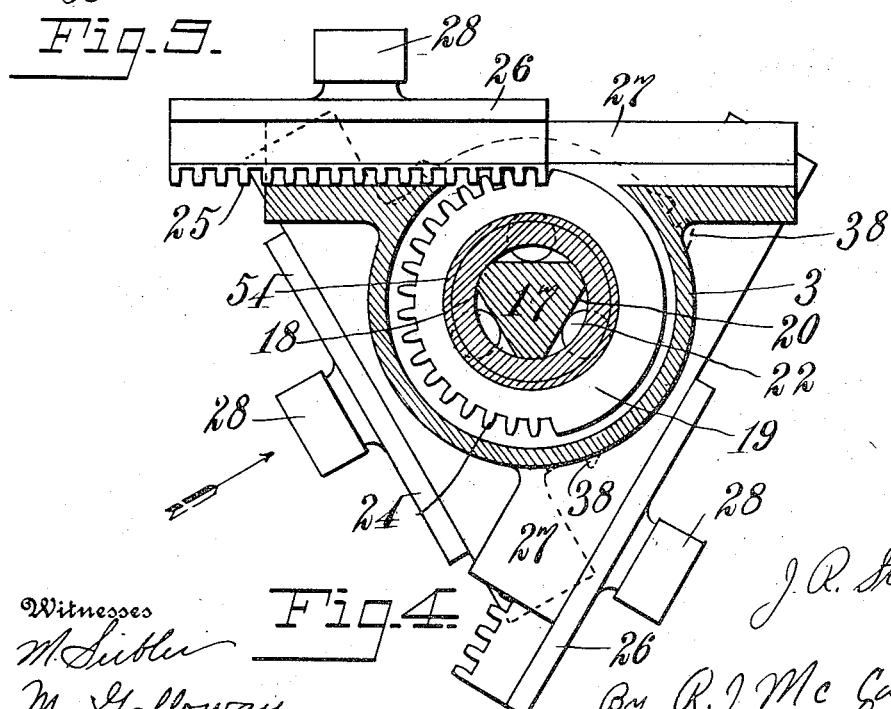

J. R. STEPHENSON.
TRANSMISSION OR CHANGE SPEED DEVICE.
APPLICATION FILED SEPT. 8, 1913. RENEWED NOV. 19, 1914.
1,189,401.
Patented July 4, 1916.
3 SHEETS—SHEET 3.
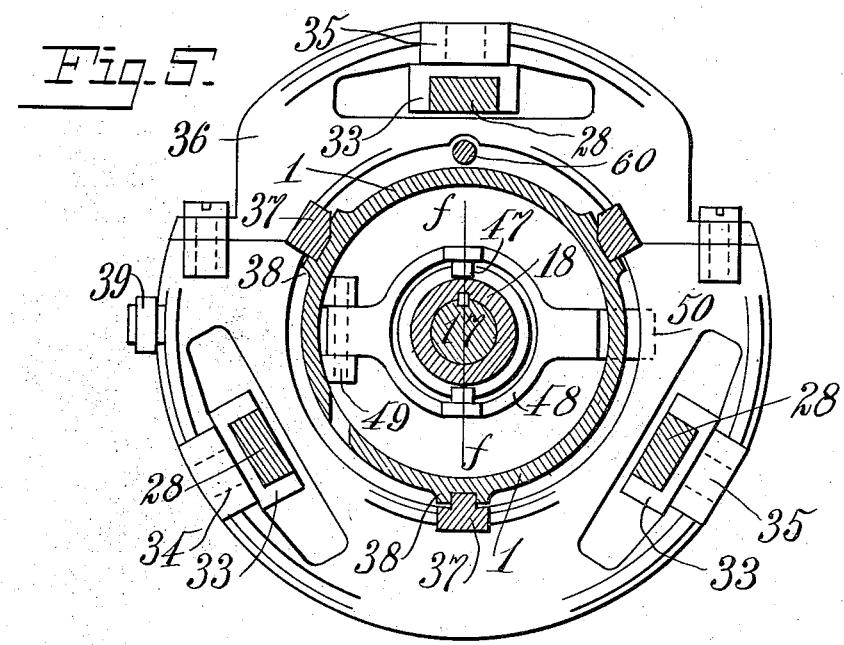
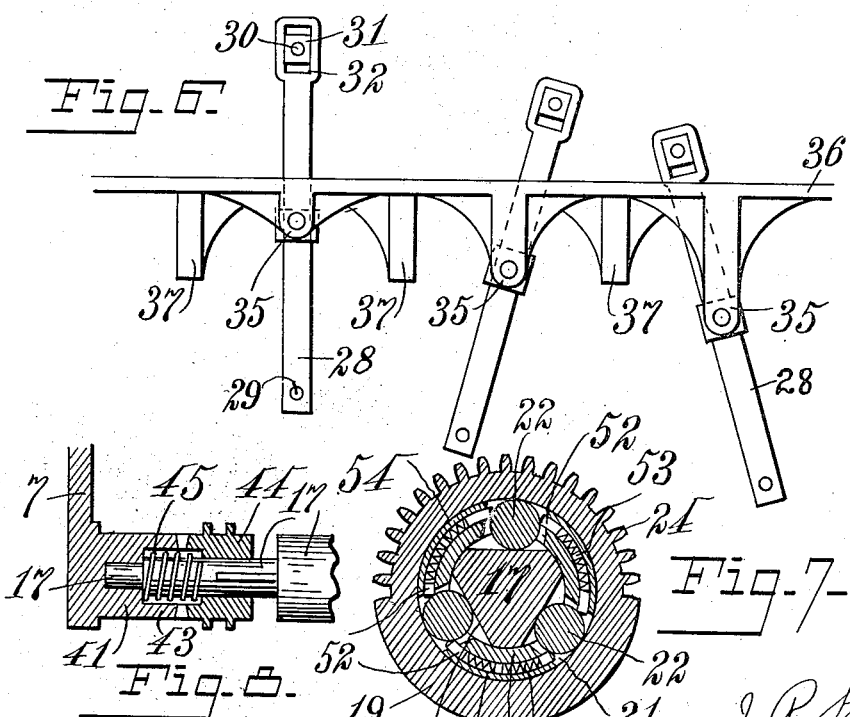

UNITED STATES PATENT OFFICE.

JAMES R. STEPHENSON, OF DAYTON, OHIO.

TRANSMISSION OR CHANGE-SPEED DEVICE.

1,189,401.   Specification of Letters Patent.   Patented July 4, 1916.

Application filed September 8, 1913, Serial No. 788,606. Renewed November 19, 1914. Serial No. 873,051.

*To all whom it may concern:*

Be it known that I, JAMES R. STEPHENSON, a citizen of the United States, residing at Dayton, in the county of Montgomery and State of Ohio, have invented certain new and useful Improvements in Transmission or Change-Speed Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in change speed or transmission devices adapted to be used on automobiles and machines tools, such as lathes and milling machines, etc.

One object of the invention is to provide a change speed device in which the various speed ratios may be selected without disengaging the driving and driven members.

Another object of the invention is to provide a device of this type by means of which an unlimited number of speed ratios may be obtained.

Another object of the invention is to provide a device of this type in which the speed ratio may be changed without subjecting the device to shocks or jars.

Another object of the invention is to provide a device of this type which eliminates the use of the usual clutch for disengaging the engine from the transmission appertaining to automobiles.

A further object of the invention is to provide a device of this type in which the direction of rotation of the driving member may be reversed.

These and other incidental objects appear in the description and drawings hereto annexed.

To the above ends, the device is compact in form, simple in construction and efficient in operation.

Referring to the accompanying drawings, Figure 1 is a plan view of the device looking in the direction of the arrows in Figs. 3 and 4. In this view only one of the transmission levers is shown, the others being the exact duplicates of it. Fig. 2 is a section on the line *a—a* of Fig. 1; Fig. 3 is a section on the line *b—b* of Fig. 1; Fig. 4 is a section on the line *c—c* of Fig. 1; Fig. 5 is a section on the line *d—d* of Fig. 1; Fig. 6 is a diagrammatic view of the means for shifting the fulcrums of the transmission levers; Fig. 7 is a section on the line *e—e* of Fig. 2; Fig. 8 is a section on the line *f—f* of Fig. 5; and Fig. 9 is a section on the line *g—g* of Fig. 2.

Throughout the specification and the different views of the drawings, similar reference characters indicate corresponding parts.

Referring more particularly to the drawings, 1 represents a cylindrical shell provided on one end with a housing 2 adapted to support the driving means, and on the other end with a housing 3 which supports the driven means. The said housing 2 is also provided with a cap 4 having a bearing 5 constituting a journal for a driving shaft 6 which is connected with the motor of the automobile or any other driving means. Mounted on the inner side of the cap 4 and on the end of the shaft 6 is a crank 7 provided with a wrist pin 8. Journaled on said wrist pin are boxes 9 which slide in cross-heads 10 extending from slides 11. Said slides 11 are mounted in guides 12 which in turn are mounted on the outside of and preferably integral with the housing 2. While in the present case I have shown three of the slides 11 and guides 12 which are mounted equi-distant around the housing 2, it is to be understood that the device may be constructed of any number of said slides and guides. To allow the slides 11 to be inserted in the guides 12 at the ends of said guides, the cross-heads 10 are detachably secured by means of screws 13 to the slides 11. The unsupported ends of the cross-heads 10 may be united by yokes 14 to give sufficient strength to said cross-heads. It will be seen from this construction, that, when the driving shaft 6 is rotated, the slides 11 will be alternately reciprocated. I do not wish to limit myself to the precise details shown and described for reciprocating these slides as any well known means may be substituted.

Mounted on the housing 3 is a cap 15 having a bearing 16 which provides a journal for a driven shaft 17. Freely journaled on said shaft 17 within the housing 3 is a sleeve 18. Freely journaled on said sleeve 18 within said housing 3 is a plurality of oscillating segment gears 19 which correspond in number with the slides 11. The segment gears 19 are adapted to be individually connected to the driven shaft 17 by any well known type of clutch.

The said shaft 17 has three flat surfaces 20 while the sleeve 18 is provided with pockets 21 which receive rollers 22. These rollers 22 lie between the shaft 17 and the segment gears 19 and are adapted to engage the flat surfaces 20 and the inner surfaces of said segment gears. The surfaces 20 and the inner surfaces of the segment gears 19 form double wedge-shaped pockets in which the rollers 22 are adapted to jam in clutching the segment gears 19 and the shaft 17. The rollers 22 are partly controlled by springs 23 which have a tendency to move said rollers into the ends of the pockets and are instrumental in allowing the gears 19 and the shaft 17 to be clutched. Said rollers may be pressed toward either end of the wedge-shaped pockets to allow the shaft 17 to be rotated in either direction as will be hereinafter described in connection with the reversing mechanism. The gears 19 are oscillated as follows: Each of said gears 19 is provided with teeth 24 which mesh with racks 25 of individual slides 26. The slides 26 are mounted in guides 27 which are preferably integral with and arranged in staggered positions equi-distant around the housing 3 in a manner similar to the guides 12. Said slides 26 are variably reciprocated by the slides 11 through means of individual transmission levers 28 which are pivotally connected at one end to said slides 26 by means of pins 29 and pivotally and slidably connected at their other ends by means of pins 30 and blocks 31 which slide within pockets 32 in said levers. The fulcrums of the transmission levers 28 are shiftable and consist of blocks 33 adapted to slide along the levers. Extending from said blocks 33 are pivot pins 34 which are journaled in brackets 35 extending from a shiftable ring 36 which extends around the shell 1. The ring 36 is provided with guides 37 adapted to travel in guide-slots 38 on the exterior of the shell 1, and may be shifted along the shell 1 to change the position of the fulcrums of the levers 28 by any well known means such as a connecting rod 39. As the slides 11 and 26 are arranged in staggered relation one to the other the brackets 35 are of varying lengths to allow the fulcrum pins 34 to be staggered as is shown in Fig. 6. The fulcrums of all the levers 28 are, therefore, in the same position relative to the ends of their respective levers.

The stroke of the slides 11 is constant while the stroke of the slides 26 is variable. The ratio of the lengths of the strokes of the slides 11 and 26 depends upon the position of the fulcrum pins 34. In the position the fulcrum pins are shown in the drawings, the strokes of the slides 11 and 26 are the same, but, when the fulcrum pins 34 are moved toward the slides 26 by shifting the ring 36, the travel or stroke of the slides 26 will become less the nearer the fulcrum pins are to said slides. The shorter the stroke of the slides 26, the less will be the speed of rotation of the driven shaft 17 as compared with the driving shaft 6 and, consequently, the greater will be the power effort for the same amount of power transmitted to the driving shaft 6. The blocks 33 are adapted to pass over the pivot pins 29 of the slides 26 and when the fulcrum pins 34 and the pivot pins 29 are in alinement, no movement will be imparted to the slides 26 and to the shaft 17, consequently this arrangement allows for the elimination of the usual clutch between the driving and driven members. It will also be noted that, by this arrangement, the shaft 17 may be initially rotated without throwing any shock upon the driving shaft 6, as the power will be gradually transmitted to the shaft 17 when the fulcrum pins 34 are moved away from the pivot pins 29.

As before stated, when the parts are in the position shown in Figs. 1 and 2 of the drawings, the driving shaft 6 and the driven shaft 17 rotate in unison. The following means are, therefore, provided to clutch the driving and driven shafts when rotated in unison and prevents the transmission levers 28 carrying any of the strain. Attached to the wrist pin 8 is a crank 40 which is mounted on a short shaft 41 journaled in a bearing 42 on the inside and at one end of the shell 1. The said shaft 41 is provided with a clutch portion 43 adapted to be engaged by a similar clutch member 44. Said clutch member 44 is splined to the driven shaft 17 and is partially controlled by a spring 45 shown in detail in Fig. 8. The clutch member 44 is provided with a spool 46 adapted to be engaged by pins 47 of a yoke 48 pivoted at 49 on the inside of the shell 1. The spring 45 is adapted to disengage the clutch members 43 and 44, while the said clutch members are adapted to be placed in engagement by an arm 50 which extends from the yoke 48 through a suitable opening in the shell 1 and which is adapted to be engaged by the ring 36 when the fulcrum pins 34 are near the position shown in Fig. 1. It will be remembered, that, when the fulcrum pins 34 are in the position shown in Fig. 1, the strokes of the slides 11 and 26 are such that the driving shaft 6 and the driven shaft 17 rotate in unison. Consequently, when the clutch members 43 and 44 are in engagement, the driven shaft 17 will be directly driven from the shaft 6 which prevents any of the transmission strains being carried by the levers 28.

The means for reversing the direction of travel of the shaft 17, which was above referred to, is as follows: The sleeve 18 is provided with annular pockets 51, one for each segment gear 19. See Figs. 2 and 7. Mounted within said pockets and on each side of each of the rollers 22 are pins 52 adapted to engage said rollers. The said pins 52 are partially controlled by the springs 23, above referred to, and which are adapted to be compressed by pins 53 carried by the sleeve 18. It will be seen, that, when the sleeve 18 is rocked in one direction, the springs 23 on one side of the rollers 22 will move said rollers toward one end of the pockets 51 formed by the surfaces 20, and the segment gears 19 will, therefore, rotate the shaft 17 in one direction of their oscillating movement. When the sleeve 18 is moved in the other direction, the springs 23 on the other side of the rollers 22 will move said rollers toward the other end of said pockets and the shaft 17 will be rotated in the opposite direction during the other stroke of oscillation of the segment gears 19. The springs 23 and the pins 52 are held within the pockets 51 by an outer sleeve 54 which also forms the journal for the oscillating segment gears 19. The width of the pockets 21 is such that their sides will engage the rollers 22 and positively move said rollers toward the ends of said pockets, if, for any reason, the tension of the springs 23 is not sufficient to perform this function. The sleeve 18 is oscillated by a pin 55 (see Fig. 2) which extends through a longitudinal slot 56 in the shaft 17 and an elongated spiral slot 57 in said sleeve 18. The pin 55 is carried by a spool 58 adapted to be engaged by a yoke 59 from which an operating arm 60 extends. The arm 60 reaches out of the shell 1 through an opening 61 and passes through the ring 36. (See Figs. 1, 2 and 5). The said arm 60 is provided with an extension 62 which may be connected to any suitable form of shifting mechanism (not shown). It will be seen that when the pin 55 is at one end of the slots 56 and 57, the rollers 22 will be moved toward one end of the wedge-shaped pockets 51 but when said pin 55 is at the other end of the slots 56 and 57 the rollers 22 will be forced toward the other ends of said pockets, thereby reversing the direction of the travel of the driven shaft 17 when the segment gears 19 are oscillated. In the position the pin 55 is shown in the drawings, (Figs. 2 and 9), the shaft 17 is being driven clock-wise, which is the forward direction when applied to automobiles. It will be noted that when the pin 55 is at the end of the slots 56 and 57 from that shown in the drawings, and the shaft 17 is being rotated in the reversed direction as applied to an automobile, the fulcrum pins 34 must be near the pivot pins 29 as the extension 62 of the arm 60 lies in the path of the ring 36. The shaft 17 can, therefore, only be rotated at reversed speed when said shaft is running at a low speed of rotation, which is the common practice in automobile construction.

Having described my invention, I claim:

1. In a device of the type specified, a rotating driving member, reciprocating driving members actuated by said rotating driving member, a rotating driven member having a plurality of engaging faces, oscillating members mounted on said driven member, rollers mounted between said oscillating members and said engaging faces, reciprocating driven members in operative relation with said oscillating members, a plurality of levers having shiftable fulcrums connecting the reciprocating driving members and the reciprocating driven members, and means for shifting said rollers on said engaging faces.

2. In a device of the type specified, a rotating driving member, reciprocating driving members actuated by said rotating driving member, a rotating driven member having engaging faces, oscillating members mounted on said rotating driven member and together with said engaging faces forming double wedge-shaped pockets, rollers mounted in said pockets and adapted to clutch said oscillating members and said rotating driven member, springs adapted to move said rollers toward the ends of the pockets, reciprocating driven members in operative relation with said oscillating members, and levers having shiftable fulcrums connecting said driving reciprocating members and said driven reciprocating members.

3. In a device of the type specified, a rotating driving member, reciprocating driving members actuated by said rotating driving member, a rotating driven member having engaging faces, oscillating members mounted on said rotating driven member and together with said engaging faces forming double wedge-shaped pockets, rollers mounted in said double wedge-shaped pockets and adapted to clutch said oscillating members and said rotating driven member, springs mounted on opposite sides of said rollers and adapted to press said rollers toward the ends of the pockets when said springs are compressed, a sleeve carrying said springs said sleeve being mounted on said rotating driven member and adapted to positively engage said rollers, means for oscillating said sleeve relative to said rotating driven member, reciprocating driven members connected to said oscillating members, and a plurality of levers having shiftable fulcrums connecting said reciprocating driving members and said reciprocating driven members.

4. In a device of the type specified, a rotating driven member having engaging faces, oscillating members mounted on said rotating driven member and together with said engaging faces forming double wedge-shaped pockets, rollers mounted in said pockets and lying between said oscillating members and said driven member, a sleeve mounted on said driven member and adapted to engage said rollers to move said rollers toward the end of said pockets thereby clutching said driven and oscillating members, said driven member being provided with a longitudinal slot and said sleeve being provided with a spiral slot, a pin extending through said slots, and means for shifting said pin whereby the direction of rotation of said driven member may be reversed.

5. In a device of the type specified, a driving member, a driven member, oscillating members, means constituting a clutch for said driven and oscillating members, means for shifting said clutch, a plurality of transmission members having variable movement connecting said driving member and said oscillating members, means for varying the movement of said transmission members, and means for varying the movement of said transmission members controlling the shifting means for said clutch means.

6. In a device of the type specified, a rotating driving member, a rotating driven member, oscillating members, means for clutching said driven member and said oscillating members, means for shifting said clutching means to change the direction of rotation of said driving means, a plurality of levers having shiftable fulcrums connecting said rotating driving means and said oscillating members, a shiftable member supporting the fulcrums of said levers and also controlling the means for shifting said clutching means.

7. In a device of the type specified, a rotating driving means, a rotating driven means, oscillating members, rollers adapted to clutch said driven means and said oscillating members, means for shifting said rollers whereby said driven means may be rotated in opposite directions by said oscillating means, a plurality of levers having shiftable fulcrums connecting said driving means and said oscillating members, and a shiftable member supporting said fulcrums and controlling the means for shifting said rollers.

8. In a device of the type specified, a rotating driving means, a rotating driven means, oscillating members, rollers adapted to clutch said driven means and said oscillating members, a sleeve adapted to shift said rollers whereby said driven means may be rotated in opposite directions by said oscillating members, means for shifting said sleeve, a plurality of levers having shiftable fulcrums connecting said driving means and said oscillating members, and a shiftable member supporting said fulcrums and controlling the means for shifting said sleeve.

9. In a device of the type specified, a rotating driving means, a rotating driven means, oscillating members, rollers adapted to clutch said driven member and said oscillating members, a sleeve adapted to shift said rollers whereby said driven member is rotated in opposite directions by said oscillating members, means including an arm for shifting said sleeve, a plurality of transmission levers having shiftable fulcrums connecting said rotating driving means and said oscillating means, a shiftable ring supporting said fulcrums and lying in the path of said arm thereby controlling the shifting of said rollers in a direction of rotation of said driven means.

10. In a device of the type specified, the combination of driving and driven shafts arranged in axial alinement, and a plurality of levers having shiftable fulcrums connecting said driving and driven shafts, said levers being adapted to be alternately oscillated by said driving shaft, and in turn adapted to alternately rotate said driven shaft, whereby said driven shaft may be variably and is constantly rotated by said driving shaft.

11. In a device of the type specified, the combination of driving and driven shafts axially alined, a plurality of reciprocating driving members connected to said driving shaft, a plurality of reciprocating driven members connected to said driven shaft, and a plurality of levers having shiftable fulcrums connecting said reciprocating driving and said reciprocating driven members, said levers being alternately oscillated by said reciprocating driving members and in turn alternately rotating said driven shaft, whereby said driven shaft may be variably and is constantly rotated by said driving shaft.

12. In a device of the type specified, the combination of driving and driven shafts axially alined, a plurality of reciprocating driving members connected to said driving shaft, a plurality of reciprocating driven members connected to said driven shaft, clutch members connecting said reciprocating driving shaft and said reciprocating driven shaft, and a plurality of levers having shiftable fulcrums connecting said reciprocating driving members and said reciprocating driven members, said levers being alternately oscillated by said reciprocating driving members and in turn alternately rotating said driven shaft, whereby said driven shaft may be variably and is constantly rotated by said driving shaft.

13. In a device of the type specified, a rotating driving member, a rotating driven member, a clutch adapted to connect both members, means including levers having shiftable fulcrums connecting said driving and driven members, a ring supporting the fulcrums of said levers and operatively connected to said clutch when the fulcrums of said levers are in a neutral position.

14. In a device of the type specified, a rotating driving member and a rotating driven member, a clutch adapted to connect said members, reciprocating driving members connected to said rotating driving member, reciprocating driven members connected to said rotating driven member, a plurality of levers having shiftable fulcrums connecting said reciprocating members, a shiftable member controlling said fulcrums, and a lever operatively connecting said clutch and said shiftable member when the fulcrums of said levers are in their neutral position.

15. A speed-varying transmission device comprising a driving shaft, a driven shaft, a plurality of reciprocable elements grouped around the driving shaft and operatively connected therewith, a corresponding plurality of reciprocable elements grouped around the driven shaft and each having a ratchet driving connection therewith, a plurality of levers operatively connecting the two groups of reciprocable elements in pairs, fulcrums for said levers, and means for uniformly and simultaneously varying the relation of the fulcrums to the arms and said levers.

16. A speed-varying transmission device comprising a driving shaft, a driven shaft, a plurality of levers grouped around said two shafts, operative connections between the driving shaft and said levers to produce oscillation of the levers by rotation of the driving shaft, ratchet connections between said levers and the driven shaft to produce rotation of the driven shaft by oscillation of the levers, fulcrums for the levers, and means for uniformly and simultaneously varying the relation of the fulcrums to the arms of said levers.

In testimony whereof I affix my signature, in presence of two witnesses.

JAMES R. STEPHENSON.

Witnesses:
R. J. McCarty,
Matthew Siebler.